United States Patent [19]
Noguchi et al.

[11] Patent Number: 5,728,442
[45] Date of Patent: Mar. 17, 1998

[54] MAGNETIC RECORDING DISK

[75] Inventors: Hitoshi Noguchi; Nobuo Yamazaki; Shinji Saito, all of Kanagawa, Japan

[73] Assignee: Fuji Photo Film Co., Ltd., Kanagawa, Japan

[21] Appl. No.: 605,860

[22] Filed: Feb. 23, 1996

[30] Foreign Application Priority Data

Feb. 27, 1995 [JP] Japan ................... 7-061522

[51] Int. Cl.$^6$ ................................... G11B 5/82
[52] U.S. Cl. ................... 428/65.3; 428/329; 428/332; 428/336; 428/694 BH; 428/694 BS; 428/694 BM; 428/900
[58] Field of Search ................. 428/65.3, 329, 428/332, 336, 694 BH, 694 BS, 694 BM, 900

[56] References Cited

U.S. PATENT DOCUMENTS

| | | | |
|---|---|---|---|
| 5,300,314 | 4/1994 | Hayakawa et al. | 427/58 |
| 5,396,391 | 3/1995 | Tanaka et al. | 360/125 |

*Primary Examiner*—Stevan A. Resan
*Attorney, Agent, or Firm*—Sughrue, Mion, Zinn, Macpeak & Seas, PLLC

[57] ABSTRACT

A magnetic recording disk which comprises a nonmagnetic support having provided thereon a magnetic layer comprising a hexagonal ferrite magnetic material dispersed in a binder, wherein the magnetic layer has an orientation ratio of 0.9 or more, a vertical diamagnetic correction squareness ratio of from 0.3 to 0.55, an in-plane coercive force of from 1,400 to 3,000 Oe, a vertical-direction coercive force of from 1,400 to 3,000 Oe, and a dry thickness of 0.8 μm or less.

5 Claims, No Drawings

MAGNETIC RECORDING DISK

FIELD OF THE INVENTION

The present invention relates to a magnetic recording disk for high-density recording. More particularly, this invention relates to a magnetic recording disk most suitable for the recording of signals having a shortest recording wavelength of 1.5 μm or less as digital data.

BACKGROUND OF THE INVENTION

The technique of magnetic recording has excellent advantages over other recording techniques, for example, that a recording medium can be repeatedly used, that signal conversion into electronic signals is so easy that a magnetic-recording apparatus can be combined with peripheral devices to construct a system, and that signals can be easily revised. Due to such advantages, magnetic recording has been widely utilized in various fields including video, audio, and computer applications. With respect to recording media, a further improvement in recording density has been always desired so as to cope with the trend toward size reduction in appliances, the desire for improvement in the quality of reproduced signals, the desire for the elongation of recording time, and the desire for an increase of recording capacity.

To improve recording density, improvements in the surface properties of a magnetic layer and improvements in the dispersibility of magnetic particles in a magnetic layer have been made. Furthermore, improvements of magnetic materials have also been made so as to enhance the magnetic characteristics of a magnetic layer.

With the recent spread of personal computers and the recent trends toward advance in application software and increase in the amount of information to be processed, floppy disks which are used as external storage media for microcomputers and personal computers and which comprise a flexible nonmagnetic support having provided thereon a magnetic layer have also come to be strongly required to have a capacity of 10 MB or larger.

In addition, a recording system in which high-density codes, such as RLL signals, having a frequency component region 1.5 times wider than conventional codes are recorded has been proposed, and the minimum recording wavelength of the signals recorded on floppy disks is decreasing to 1.5 μm or less, and even to 1.0 μm or less.

From the standpoint of improving the recording density, the gap lengths of magnetic heads are, of course, decreasing further to 0.5 μm or less.

Use of a hexagonal ferrite represented by barium ferrite as ferromagnetic particles for enabling short-wavelength high-density recording is disclosed in, e.g., JP-B-62-49656 (the term "JP-B" as used herein means an "examined Japanese patent publication") and JP-B-60-50323.

However, the magnetic recording medium proposed in JP-B-60-50323, which contains hexagonal ferrite ferromagnetic particles oriented vertically, has the following drawback, although improved in reproduced output in a short-wavelength region. When the proposed magnetic recording medium is used with the ring head currently in use, it gives isolated inversion waves having a dipulse-like waveform to show poor waveform symmetry. Namely, the prior art medium has poor peak-shift characteristics, which are important in magnetic recording media, such as floppy disks, for computers.

In the magnetic recording medium proposed in JP-B-62-49656, the vertical-direction squareness ratio is regulated to a low value of from 0.3 to 0.7 to thereby compensate for the drawback of the vertically oriented medium. However, the magnetic recording media in the Examples given in the above-cited reference have a magnetic-layer thickness of 3.0 μm and are hence insufficient in overwriting characteristics, which are also important in floppy disks.

In overwriting, signals having a shorter wavelength are recorded over longer-wavelength signals which have been recorded. Hence, lines of the magnetic force used for recording the shorter-wavelength signals cannot penetrate deep into the magnetic layer, so that the longer-wavelength signals which have been recorded cannot be erased. The most effective technique for eliminating this problem is to reduce the magnetic-layer thickness.

To attain both of the desired short-wavelength output and overwriting characteristics, JP-A-5-120676 (the term "JP-A" as used herein means an "unexamined published Japanese patent application") discloses a magnetic recording disk comprising a nonmagnetic support having provided thereon a nonmagnetic layer, and a magnetic layer provided on the nonmagnetic layer, the magnetic layer having a thickness of 0.5 μm or less and containing hexagonal ferrite ferromagnetic particles. This prior art recording disk also has a vertical-direction squareness ratio of 0.6 or more and is hence incapable of ensuring sufficient peak-shift characteristics. In addition, the magnetic recording disks in the Examples given in the above-cited reference have a coercive force lower than 1,400 Oe and are hence incapable of ensuring sufficient values of reproduced output in the case where short-wavelength recording is advanced for a higher recording density.

Although the various requirements described above should be met in order to obtain a magnetic recording disk, such as a floppy disk, having a large capacity, no means for satisfying all those requirements has been proposed.

SUMMARY OF THE INVENTION

The present invention has been achieved in view of the problems of the prior art techniques described above.

An object of the present invention is to provide a magnetic recording disk satisfactory in electromagnetic characteristics, overwriting characteristics, and peak-shift characteristics and most suitable for digital data recording.

This and other objects of the present invention have been accomplished with a magnetic recording disk which comprises a nonmagnetic support having provided thereon a magnetic layer comprising a hexagonal ferrite magnetic material dispersed in a binder, wherein the magnetic layer has an orientation ratio of 0.9 or more, a vertical diamagnetic correction squareness ratio of from 0.3 to 0.55, an in-plane coercive force of from 1,400 to 3,000 Oe, a vertical-direction coercive force of from 1,400 to 3,000 Oe, and a dry thickness of 0.8 μm or less.

DETAILED DESCRIPTION OF THE INVENTION

The magnetic recording disk of the present invention, which has a magnetic layer comprising a hexagonal ferrite magnetic material, is characterized in that the magnetic layer has specific values with respect to an orientation ratio, vertical diamagnetic correction squareness ratio (SQn), in-plane coercive force (Hc), vertical-direction coercive force (Hcn), and dry thickness. Due to this, the magnetic recording disk provided by the present invention ensures the symmetry of recording/reproduction waveform and reproduced output and has suitability for overwriting and modulation.

The layer constitutions with which the effects of the present invention are produced are as follows. The first layer constitution of the magnetic recording medium comprises a nonmagnetic flexible support having provided thereon a magnetic layer comprising a hexagonal ferrite magnetic material. The second layer constitution of the magnetic recording medium comprises a nonmagnetic flexible support having provided thereon a nonmagnetic layer mainly comprising inorganic nonmagnetic particles dispersed in a binder, and a magnetic layer provided on the nonmagnetic layer and comprising a hexagonal ferrite magnetic material.

In the magnetic recording disk of the present invention, the magnetic layer has a thickness of 0.8 μm or less, which thickness value ensures overwriting characteristics. The thickness of the magnetic layer is preferably 0.5 μm or less, more preferably 0.3 μm or less.

If the magnetic layer has too large a thickness, the magnetic recording disk is impaired in overwriting characteristics, which are required for digital data recording. This tendency is pronounced especially when a recording wavelength of 1.5 μm or less is used.

Although the lower limit of the magnetic-layer thickness is not particularly limited, it should be noted that too small a magnetic-layer thickness results in a decrease in reproduced output. The practical lower limit thereof is 0.05 μm.

The magnetic layer of the magnetic recording disk of the present invention has an orientation ratio of 0.9 or more, preferably 0.95 or more. The orientation ratio for a disk-form medium is a value obtained by dividing the minimum circumferential-direction squareness ratio by the maximum circumferential-direction squareness ratio; the higher the value of this orientation ratio, the smaller the circumferential-direction output fluctuations. Namely, magnetic recording disks having higher orientation ratios are preferred. By regulating this orientation ratio to a value as high as 0.9 or more, suitability for modulation can be ensured. The upper limit of the orientation ratio is theoretically 1.

The SQn, the vertical-direction squareness ratio calculated through diamagnetic correction, of the magnetic layer is from 0.3 to 0.55, preferably from 0.4 to 0.5. If the SQn of the magnetic layer exceeds 0.55, an increased vertical magnetization component results and this leads to impaired waveform symmetry in recording/reproduction with a ring head. Namely, the SQn values higher than 0.55 disadvantageously result in isolated inversion waves having a dipulse-like waveform and enhanced peak shifting. If the SQn of the magnetic layer is lower than 0.3, the vertical magnetization component is so small that recording demagnetization in a short-wavelength region is increased, resulting in a decrease in reproduced output.

Since the vertical magnetization component is thus reduced to ensure satisfactory peak-shift characteristics, self-demagnetization and recording demagnetization tend to be enhanced and short-wavelength output tends to decrease. It is therefore necessary to regulate not only the in-plane Hc but the vertical-direction Hc to 1,400 to 3,000 Oe, preferably 1,700 to 2,500 Oe. If the coercive force of the magnetic layer is lower than 1,400 Oe, it is not preferred because recording demagnetization increases and short-wavelength output decreases. If the Hc of the magnetic layer exceeds 3,000 Oe, satisfactory recording with currently used heads is impossible, resulting in a decrease in reproduced output. Although in JP-B-62-50888 the ratio of in-plane coercive force to vertical-direction coercive force is regulated to a value in a specific range, the magnetic recording media described in the Examples given therein have a coercive force of 1,000 Oe or less and show insufficient output in a short-wavelength region.

Means for regulating mainly SQn and orientation ratio are not particularly limited. Preferred examples thereof include the following.

(1) A method in which a coating layer to be a magnetic layer is passed through two alternating current (AC) magnetic-field generators while changing the frequency and intensity of each AC magnetic field, whereby the randomness of orientation of magnetic particles is regulated.

In this case, the AC magnetic fields each has a frequency of usually from 30 to 80 Hz, preferably from 50 to 60 Hz, and a magnetic field intensity of usually from 100 to 1,000 G, preferably from 200 to 600 G.

(2) A method in which unlike-pole-facing permanent magnets are disposed respectively on the upper and lower sides of the nonmagnetic support having a coating to be a magnetic layer, and the coated support is passed between the magnets to conduct vertical orientation while changing the distance between the two magnets, whereby the magnetic field intensity is regulated to control the degree of vertical orientation of magnetic particles.

In this case, the magnetic field intensity of the magnets is usually from 2,000 to 8,000 G, preferably from 4,000 to 6,000 G, and the distance between the magnets is regulated in the range of usually from 5 to 50 mm, preferably from 10 to 30 mm.

(3) A method in which orientation conditions including the traveling speed of the nonmagnetic support, temperature during orientation, and the degree of dryness of the coating layer before orientation are selected. The traveling speed is usually from 0.5 to 10 m/sec, preferably from 2 to 6 m/sec. The temperature during orientation is usually from 60° to 120° C., preferably from 80° to 100° C. The degree of dryness of the coating layer before orientation is such that usually 60% by weight or more, preferably 80% by weight or more, of the organic solvent used remains in the coating layer.

Examples of the nonmagnetic particles used in the nonmagnetic layer include inorganic nonmagnetic particles, carbon blacks, and abrasive materials. It is preferred that from 3 to 20% by weight of the nonmagnetic particles be accounted for by a carbon black. Preferred carbon blacks are those having a small particle size and a high oil absorption, specifically having an average particle diameter of from 10 to 40 mμ and a DBP absorption of from 100 to 400 ml/100 g. Use of such a carbon black enables the overlying magnetic layer to have a smooth surface, and this results in a decrease in spacing loss, which is the loss attributable to the space between the magnetic layer and a recording/reproducing head. As a result, reproduced output can be heightened. In addition, since such a carbon black is apt to form a structure in the nonmagnetic layer, a reduced surface electrical resistance can be obtained and improved running durability with the diminished occurrence of dropouts can be attained.

Incorporation of 3 to 20 wt % fatty acid ester as a lubricant into the nonmagnetic layer is effective in mitigating the drawback that the amount of a lubricant capable of being contained in the magnetic layer is limited by the small magnetic layer thickness. Specifically, the problem that the gradual consumption of a lubricant due to sliding on a recording/reproducing head leads to lubricant deficiency and this results in magnetic layer abrasion and increased friction and may finally result in sticking can be mitigated because the migration of a lubricant from the nonmagnetic layer to the magnetic layer compensates for the constant lubricant consumption in the magnetic layer.

In the present invention, the magnetic layer comprising a hexagonal ferrite magnetic material is not particularly limited in constitution thereof, as long as at least one such layer is provided on a nonmagnetic support. However, the magnetic layer comprising a hexagonal ferrite magnetic material is preferably provided as the uppermost layer among the constituent layers. Another preferred constitution in the present invention has a nonmagnetic layer comprising inorganic nonmagnetic particles dispersed in a binder, between the nonmagnetic support and the magnetic layer comprising a hexagonal ferrite magnetic material. However, the magnetic recording disk of the present invention should not be construed as being limited to these constitutions. For example, a magnetic layer comprising a magnetic material other than hexagonal ferrite magnetic materials may be provided in place of the nonmagnetic layer.

In the present invention, a nonmagnetic layer and a magnetic layer comprising particles of a ferromagnetic material other than hexagonal ferrite magnetic materials may be formed between the nonmagnetic support and the layer comprising a hexagonal ferrite magnetic material. Whichever layer is formed first in this case, the effects of the present invention are basically obtainable.

When a nonmagnetic layer and/or a magnetic layer is provided in this invention besides the layer comprising a hexagonal ferrite magnetic material, the layer comprising a hexagonal ferrite magnetic material is referred to also as an upper layer or an upper magnetic layer and the other layers each is referred to also as a lower layer. When the lower layers are distinguished from each other by magnetic or nonmagnetic nature, the lower layers are also called a lower magnetic layer and a lower nonmagnetic layer, respectively. When a layer is simply called a magnetic layer, this layer is the layer comprising a hexagonal ferrite magnetic material.

In the present invention, the layers, such as the layer comprising a hexagonal ferrite magnetic material, any other magnetic layer, and the lower nonmagnetic layer, each may be constituted so as to have a multilayer structure and a desired composition if necessary. When the layer comprising a hexagonal ferrite magnetic material has a multilayer structure, these constituent layers as a whole are regarded as one layer.

The upper layer may contain another kind of ferromagnetic particles in combination with the hexagonal ferrite magnetic material, if needed. However, the proportion of the hexagonal ferrite magnetic material is usually from 50 to 100% by weight, preferably from 80 to 100% by weight, based on all ferromagnetic particles in the upper layer. The ferromagnetic particles for use in the lower layer are not particularly limited, and the same hexagonal ferrite magnetic material as in the upper layer can be used. The lower layer is free from the above-described requirements which the upper layer is required to satisfy. The term "ferromagnetic particles" used hereinafter means any kind of ferromagnetic particles including the hexagonal ferrite magnetic particle, unless otherwise indicated.

In the present invention, the magnetic layer comprising a hexagonal ferrite magnetic material may be the only layer. However, a lower nonmagnetic layer is preferably provided between the magnetic layer and the support because the formation of a lower nonmagnetic layer contributes to an improvement in surface properties and facilitates a thickness reduction for the upper layer. A lower magnetic layer comprising acicular ferromagnetic particles or other magnetic particles is also preferably provided as another lower layer between the upper magnetic layer and the support, because the lower magnetic layer contributes to an improvement in long-wavelength characteristics.

The SFD of the magnetic layer in the longitudinal direction is 0.5 or less, preferably 0.3 or less, to lower the distribution of coercive force.

If a lower magnetic layer is provided, the ferromagnetic particles contained therein are preferably fine ferromagnetic particles of metal mainly comprising iron particles of cobalt-modified iron oxide or particles of iron oxide. If a lower nonmagnetic layer is provided, the inorganic nonmagnetic particles contained therein are preferably particles of at least one of titanium dioxide, barium sulfate, zinc oxide, and α-iron oxide.

The lower layer and the upper layer are preferably coated by a wet-on-wet coating method according to U.S. Pat. No. 4,844,946.

The hexagonal ferrite magnetic material for use in the upper layer will be explained below.

Examples of the hexagonal ferrite contained in the upper layer in the present invention include substitutional ferrites such as barium ferrite, strontium ferrite, lead ferrite and calcium ferrite, Co-substituted ferrites, and hexagonal Co particles. Specific examples thereof include barium ferrite and strontium ferrite both of the magnetoplumbite type, and barium ferrite and strontium ferrite both of the magnetoplumbite type containing a spinel phase as a part thereof. Besides the constituent atoms, these ferrites may contain other atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pt, Nd, P, Co, Fin, Zn, Ni, St, B, Ge, and Nb. In general, hexagonal ferrite magnetic material in which elements such as Co—Ti, Co—Ti—Zr, Co—Ti—Zn, Ni—Ti—Zn, and Ir—Zn are added can be used. Particularly preferable hexagonal ferrite magnetic materials are Co-substituted ferrites such as barium ferrite, and strontium ferrite. The coercive force can be regulated by, for example, unifying the particle diameter and particle thickness, regularizing the thickness of the spinel phase of hexagonal ferrites, regularizing the amount of substituted elements of the spinel phase, or regularizing the substituted site of the spinel phase.

The hexagonal ferrite magnetic material for use in the present invention is usually hexagonal platy particles. The width of the plates measured with an electron microscope is the plate diameter thereof, and the thickness of the plates is the plate thickness thereof.

In the present invention, the plate diameter of the hexagonal ferrite magnetic material is usually from 0.01 to 0.1 μm, preferably from 0.02 to 0.08 μm, and more preferably from 0.03 to 0.05 μm. The plate thickness thereof is usually from 0.001 to 0.05 μm, preferably from 0.005 to 0.03 μm, and more preferably from 0.01 to 0.02 μm. The aspect ratio (tabular ratio, plate diameter/plate thickness) is usually from 1 to 8, preferably from 2 to 6, and more preferably from 3 to 5. The specific surface area by BET method ($S_{BET}$) is from 20 to 100 m$^2$/g, preferably from 30 to 80 m$^2$/g. If the specific surface area thereof is less than 20m$^2$/g, it is not preferred because an increased noise results; while if the specific surface area thereof exceeds 100 m$^2$/g, it is not preferred because satisfactory surface properties are difficult to obtain. The water content thereof is preferably from 0.01 to 2%. The water content is preferably optimized according to the kind of the binder used. The pH is preferably optimized by the combination of the binder used. The range thereof is usually from 4 to 12, preferably from 6 to 10. If needed, the surface of the magnetic material may be treated with, for example, Al, Si, P, or oxides thereof. The surface is preferably treated with $Al_2O_3$ or $SiO_2$. The amount or proportion of the surface-treating agent is preferably varied according to the kind of the binder used. When the amount is from 0.1 to 10% based on the amount of the magnetic material, it is preferred because it reduces the adsorption of a lubricant, e.g., a fatty acid, to 100 mg/m² or less. When the magnetic material contains soluble inorganic ions of, e.g., Na, Ca, Fe, Ni, and Sr, these ions do not particularly influence the properties as long as the concentration thereof is 500 ppm or less. The σs thereof is 50 emu/g or more, preferably 60 emu/g or more. The tap density thereof is preferably 0.5 g/ml or more, more preferably 0.8 g/ml or more. For producing the hexagonal ferrite, any of various methods may be used such as a glass crystallization method, a coprecipitation method, and a hydrothermal reaction method.

The ferromagnetic particles for use in the lower magnetic layer of the present invention include known ferromagnetic particles such as γ-FeOx (x=1.33–1.5), Co-modified γ-FeOx (x=1.33–1.5), ferromagnetic alloy fine particles containing Fe, Ni, or Co as the main component (75% or more), and acicular barium ferrite. Preferred are ferromagnetic alloy particles containing α-Fe as the main component and the Co-modified γ-FeOx. Besides the atoms specified above, the ferromagnetic particles may contain other atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Fin, Zn, Ni, Sr, B, Ge, and Nb.

Before being dispersed, the fine ferromagnetic particles may be treated with, for example, a dispersant, a lubricant, a surfactant, or an antistatic agent. These treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014.

The fine ferromagnetic alloy particles among the ferromagnetic particles of the above-enumerated kinds may contain a small amount of hydroxide or oxide. The hydroxide and oxide prepared by a known method can be used. Examples thereof include: a method in which reduction is conducted with a composite organic acid salt (mainly oxalate) and a reducing gas such as hydrogen; a method comprising reducing iron oxide with a reducing gas such as hydrogen to obtain Fe or Fe—Co particles; a method comprising pyrolyzing a metal carbonyl compound; a method in which reduction is conducted by adding a reducing agent such as sodium boron hydride, hypophosphite, or hydrazine to an aqueous solution of ferromagnetic metal; and a method comprising vaporizing metal in a low-pressure inert gas to obtain fine particles. The thus-obtained ferromagnetic alloy particles may be used after a known gradual oxidation treatment. This treatment can be conducted by any of the following: a method comprising immersing the particles in an organic solvent, followed by drying; a method comprising immersing the particles in an organic solvent and feeding an oxygen-containing gas to form an oxide film on the surfaces, followed by drying; and a method in which an oxide film is formed on the surfaces by controlling the partial pressures of oxygen gas and an inert gas, without using an organic solvent. The ferromagnetic particles have a specific surface area by BET method of 25 to 80 m²/g, preferably 40 to 70 m²/g. If the specific surface area is lower than 25 m²/g, it is not preferred because an increased noise results; while if the specific surface area is higher than 80 m²/g, it is not preferred because satisfactory surface properties are difficult to obtain. The σs of the magnetic iron oxide particles is 50 emu/g or more, preferably 70 emu/g or more. The σs of the fine ferromagnetic metal particles is preferably 100 emu/g or more, more preferably from 110 to 170 emu/g. The coercive force thereof is preferably from 500 to 2,500 Oe, more preferably from 800 to 2,000 Oe.

The tap density of γ-iron oxide is preferably 0.5 g/ml or more, more preferably 0.8 g/ml or more. In alloy particles, the tap density thereof is preferably from 0.2 to 0.8 g/ml. Tap densities of alloy particles more than 0.8 g/ml tend to result in acceleration of the oxidation of the ferromagnetic particles during compaction, so that a sufficient σs is difficult to obtain. If the tap density of alloy particles is less than 0.2 g/ml, insufficient dispersion tends to result. In using γ-iron oxide, the proportion of divalent iron to trivalent iron is preferably from 0 to 20%, more preferably from 5 to 10%. Further, the amount of cobalt atoms is from 0 to 15%, preferably from 2 to 8%, based on the amount of iron atoms.

The lower magnetic layer provided under the upper magnetic layer comprising a hexagonal ferrite in the present invention has a higher orientation in the longitudinal direction than that in the vertical direction. The coercive force thereof is preferably 500 to 2,500 Oe, the Br thereof is from 1,000 to 4,000 G, and the SFD thereof is 0.6 or less.

The center-line average surface roughness of each of the lower layer and the upper layer in the present invention is preferably 0.006 μm or less, if the individual layers (which each may have a multilayer structure) are separately coated.

The lower nonmagnetic layer of the present invention is described below.

The inorganic nonmagnetic particles can be selected from inorganic compounds such as metal oxides, metal carbonates, metal sulfates, metal nitrides, metal carbides, and metal sulfides. Specific examples of the inorganic compounds include α-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They may be used alone or in combination. Particularly preferred of these are titanium dioxide, zinc oxide, α-iron oxide, and barium sulfate. The particle sizes of the nonmagnetic particles are preferably from 0.005 to 2 μm, more preferably from 0.01 to 0.2 μm. It is, however, possible to use a combination of two or more kinds of nonmagnetic particles having different particle sizes, if needed. Alternatively, the same effect can be produced by using one kind of nonmagnetic particles having a wide particle diameter distribution. The tap density thereof is from 0.05 to 2 g/ml, preferably from 0.2 to 1.5 g/ml. The water content thereof is from 0.1 to 5%, preferably from 0.2 to 3%. The pH thereof is from 2 to 11, preferably from 6 to 9. The specific surface area thereof is from 1 to 100 m²/g, preferably from 5 to 50 m²/g, and more preferably from 7 to 40 m²/g. The crystallite size thereof is preferably from 0.01 to 2 μm. The oil absorption thereof as measured with DBP is from 5 to 100 ml/100 g, preferably from 10 to 80 ml/100 g, and more preferably from 20 to 60 ml/100 g. The specific gravity thereof is from 1 to 12, preferably from 3 to 6. The particle shape thereof may be any of the acicular, spherical, polyhedral, platy, or hexagonal platy shapes. The ignition loss thereof is preferably 20% or less. The inorganic particles for use in the present invention preferably have a Mohs' hardness of from 4 to 10. The roughness factor of the surfaces of these kinds of particles is preferably from 0.8 to 1.5, more preferably from 0.9 to 1.2. The stearic acid (SA)

adsorption thereof is from 1 to 20 µmol/m$^2$, preferably from 2 to 15 µmol/m$^2$. The nonmagnetic particles preferably have a heat of wetting by water in the range of 200 to 600 erg/cm$^2$ at 25° C. A solvent which gives a heat of wetting in the above range can be used. The appropriate number of water molecules present on the surfaces thereof at 100° to 400° C. is from 1 to 10 per 100 Å$^2$. The isoelectric-point pH thereof in water is preferably from 3 to 6. The surfaces of these particles are preferably treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$, and $ZrO_2$ are preferred from the standpoint of dispersibility, with $Al_2O_3$, $SiO_2$, and $ZrO_2$ being particularly preferred. These may be used in combination or alone. A treated surface layer formed by coprecipitation may be used according to purpose. It is also possible to use a treated surface layer having a structure formed by first treating with alumina and then treating the resulting surface layer with silica, or to use a treated surface layer having a structure which is the reverse of the above structure. Although the treated surface layer may be made porous if needed, a homogeneous and dense surface layer is generally preferred.

Specific examples of inorganic nonmagnetic particles for use in the present invention include UA5600, UA5605, and Nanotite manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN250, and DPN250BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha, Ltd.; ECT-52, STT-4D, STT-30D, STT-30, and STT-65C manufactured by Titan Kogyo K.K.; T-1 manufactured by Mitsubishi Material Co., Ltd.; NS-0, NS-3Y, and NS-BY manufactured by Nippon Shokubai Co., Ltd.; MT-100S, MT-100T, MT-150W, MT-500B, MT-600B, and MT-100F manufactured by Teika Co., Ltd.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo CO., Ltd.; and nonmagnetic particles obtained by calcining them.

Especially preferred inorganic nonmagnetic particles are titanium dioxide particles. Consequently, titanium dioxide is described in detail with respect to production processes thereof. For producing titanium dioxide products, the sulfuric acid process and the chlorine process are mainly used. In the sulfuric acid process, a raw ore of ilmenite is leached with sulfuric acid to extract, e.g., Ti, Fe as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80° to 1,000° C. after addition of a particle size regulator or the like gives crude titanium oxide. The titanium oxide is of rutile form or anatase form according to the nucleating agent added in hydrolysis. This crude titanium oxide is ground, sieved, and subjected to surface treatment, thereby to produce a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ is instantaneously reacted with oxygen at a temperature of 1,000° C. or higher to obtain crude titanium oxide. For imparting pigmenting properties to the crude titanium oxide yielded in the above oxidative decomposition step, the same finishing technique as in the sulfuric acid process is employed. The surface treatment of the titanium oxide material may be conducted as follows. The material is dry-ground, and water and a dispersant are then added thereto. The resulting slurry is subjected to wet grinding, followed by centrifugal separation to separate coarse particles. The resulting slurry of fine particles is then transferred to a surface treatment tank, where surface covering with a metal hydroxide is performed. First, an aqueous solution of a predetermined amount of a salt of, e.g., Al, Si, Ti, Zr, Sb, Sn, or Zn, is added to the slurry and an acid or alkali is added to neutralize the resulting slurry to thereby form a hydrous oxide and cover the surfaces of the titanium oxide particles with the oxide. The water-soluble salts formed as by-products are removed by decantation, filtration, and washing. The slurry is subjected to final pH adjustment, filtration, and washing with pure water. The resulting cake after washing is dried with a spray dryer or band dryer. Finally, the dry particles are ground with a jet mill to give a product. In place of such a wet process, the surface treatment can be conducted by passing vapors of $AlCl_3$ and $SiCl_4$ through titanium oxide particles and then passing water vapor to treat the particle surfaces with Al and Si. With respect to processes for the production of other pigments, reference may be made to *Characterization of Powder Surfaces*, published by Academic Press.

Carbon black may be incorporated into the lower nonmagnetic layer to reduce the known effect, Rs. For this purpose, carbon black, such as furnace black for rubbers, thermal black for rubbers, coloring black, and acetylene black, can be used. The specific surface thereof is from 100 to 500 m$^2$/g, preferably from 150 to 400 m$^2$/g, and the DBP absorption thereof is from 20 to 400 ml/100 g, preferably from 30 to 200 ml/100 g. The particle diameter thereof is from 5 to 80 mµ, preferably from 10 to 50 mµ, and more preferably from 10 to 40 mµ. The carbon black preferably has a pH of 2 to 10, a water content of 0.1 to 10%, and a tap density of 0.1 to 1 g/ml. Specific examples of the carbon black for use in the present invention include BLACK-PEARLS 2000, 1300, 1000, 900, 800, 880, 700, and VULCAN XC-72 manufactured by Cabot Corporation; #3050B, #3150B, #3250B, #3750B, #3950B, #950, #650B, #970B, #850B, and MA-600 manufactured by Mitsubishi Chemical Corporation; CONDUCTEX SC manufactured by Columbia Carbon Co.; RAVEN 8800, 8000, 7000, 5750, 5250, 3500, 2100, 2000, 1800, 1500, 1255, and 1250 manufactured by RAVEN; and Ketjen Black EC manufactured by Lion Akzo Co., Ltd. The carbon black may be surface-treated with a dispersant or another agent or grafted with a resin before use. The carbon black whose surfaces have been partly graphitized may also be used. Further, before being added to a coating fluid, the carbon black may be dispersed into a binder. These carbon blacks can be used in an amount of 50% or less by weight based on the inorganic particles and 40% or less based on the total weight of the nonmagnetic layer. These carbon blacks can be used alone or in combination. With respect to carbon blacks usable in the present invention, reference may be made to, for example., *Carbon Black Binran (Carbon Black Handbook)*, edited by Carbon Black Association.

Organic particles for use in the present invention include acrylic-styrene resin particles, benzoguanamine resin particles, melamine resin particles, and phthalocyanine pigments. Other usable examples thereof include polyolefin resin particles, polyester resin particles, polyamide resin particles, polyimide resin particles, and poly(fluoride ethylene) resins. For producing these organic particles, techniques such as those described in JP-A-62-18564 and JP-A-60-255827 can be used.

It should be noted that although an undercoat layer is provided in ordinary magnetic recording media, this undercoat layer, which has a thickness of 0.5 μm or less, is intended to improve adhesion between the support and the magnetic or another layer and is different from the lower layer in the present invention. In the present invention, an undercoat layer is preferably provided to improve adhesion between the lower layer and the support.

The same binders, lubricants, dispersants, additives, solvents, and dispersing techniques as those for the magnetic layer can be used for the nonmagnetic layer. In particular, known techniques usable for magnetic layers can be applied with respect to the amounts and kinds of binders and the amounts and kinds of additives and dispersants. The thickness of the lower nonmagnetic layer is from 0.2 to 5 μm, preferably from 1 to 3 μm.

The binder for use in the upper layer and the lower layer in the present invention may be a conventionally known thermoplastic resin, thermosetting resin, or reactive resin, or a mixture thereof.

The thermoplastic resin may be one having a glass transition temperature of −100° to 150° C., a number-average molecular weight of 1,000 to 200,000, preferably from 10,000 to 100,000, and a degree of polymerization of about from 50 to 1,000. Examples of the thermoplastic resins include polymers or copolymers containing a structural unit derived from vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, or vinyl ether, polyurethane resins, and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate. These resins are described in detail in *Plastic Handbook* published by Asakura Shoten. It is also possible to use a known resin of the electron beam-curing type for each of the layers. Examples of the resins and production processes therefor are described in detail in JP-A-62-256219.

The resins enumerated above can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, and vinyl chloride-vinyl acetate-maleic anhydride copolymers, and further include combinations of these with polyisocyanate.

The polyurethane resins may have a known structure such as polyester polyurethane, polyether polyurethane, polyether polyester polyurethane, polycarbonate polyurethane, polyester polycarbonate polyurethane, or polycaprolactone polyurethane.

For obtaining further improved dispersibility and durability, it is preferred to use, according to need, one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (R represents a hydrocarbon group), an epoxy group, —SH, and —CN. The amount of the polar group(s) is from $10^{-1}$ to $10^{-8}$ mol/g, preferably from $10^{-2}$ to $10^{-6}$ mol/g.

Specific examples of those binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippolan N2301, N2302, and N2304 manufactured by Nippon Polyurethane Industry Co. Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramin 4020, 5020, 5100, 5300, 9020, 9022, and 7020 manufactured by Dainichiseika Color & Chemicals Mfg., Co., Ltd.; MX5004 manufactured by Mitsubishi Chemical Corporation; Sunprene SP-150, TIM-3003, and TIM-3005 manufactured by Sanyo Chemical Industries, Co., Ltd.; and Saran F310 and F210 manufactured by Asahi Chemical Industry Co., Ltd.

The amount of the binder for use in the nonmagnetic layer or in the magnetic layer in the present invention is from 5 to 50% by weight, preferably from 10 to 30% by weight, based on the amount of the nonmagnetic particles or the ferromagnetic particles, respectively. In employing a vinyl chloride resin, it is preferred to use the same in an amount of 5 to 30% by weight in combination with from 2 to 20% by weight polyurethane resin and from 2 to 20% by weight polyisocyanate. In using polyurethane in the present invention, this resin preferably has a glass transition temperature of −50° to 100° C., an elongation at break of 100 to 2,000%, a stress at break of 0.05 to 10 kg/cm$^2$, and a yield point of 0.05 to 10 kg/cm$^2$.

The magnetic recording medium of the present invention has at least one layer. Consequently, it is, of course, possible to form the nonmagnetic layer and the magnetic layers so that these layers differ from each other in binder amount; proportion of vinyl chloride resin, polyurethane resin, polyisocyanate, or another resin in the binder; molecular weight of each resin contained in each magnetic layer; polar group amount, the above-described physical properties of resin according to need. For attaining this, known techniques concerning multilayered magnetic layers are applicable. For example, in forming layers having different binder amounts, an increase in binder amount in the upper magnetic layer is effective in diminishing the marring of the upper magnetic layer surface, while an increase in binder amount in either the upper magnetic layer or the lower nonmagnetic layer to impart flexibility is effective in improving head touching.

Examples of the polyisocyanate for use in the constituent layers in the present invention include isocyanates such as tolylene diisocyanate, 4,4'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed through condensation of isocyanates. These isocyanates are commercially available under the trade names of: Coronate L, Coronate HL, Coronate 2030, Coronate 2031, Millionate MR, and Millionate MTL manufactured by Nippon Polyurethane Co., Ltd.; Takenate D-102, Takenate D-110N, Takenate D-2Q0, and Takenate D-202 manufactured by Takeda Chemical Industries, Ltd.; and Desmodule L, Desmodule IL, Desmodule N, and Desmodule HL manufactured by Sumitomo Bayer Co., Ltd. For each of the layers, these polyisocyanates may be used alone, or used in combination of two or more thereof, taking advantage of a difference in curing reactivity.

The carbon black for use in the magnetic layer or the lower magnetic layer which is optionally formed in the present invention includes furnace black for rubbers, thermal black for rubbers, coloring black, and acetylene black. The carbon black preferably has a specific surface area of 5 to 500 $m^2$/g, a DBP absorption of 10 to 400 ml/100 g, a particle diameter of 5 to 300 mμ, a pH of 2 to 10, a water content of 0.1 to 10%, and a tap density of 0.1 to 1 g/ml. Specific examples of carbon blacks usable in the present invention include BLACKPEARLS 2000, 1300, 1000, 900, 800, 700, and VULCAN XC-72 manufactured by Cabot Corporation; #80, #60, #55, #50, and #35 manufactured by Asahi Carbon Co., Ltd.; #2400B, #2300, #900, #1000, #30, #40, and #10B manufactured by Mitsubishi Chemical Corporation; and CONDUCTEX SC manufactured by Columbia Carbon Co.; and RAVEN 150, 50, 40, and 15 manufactured by Raven Co., Ltd. The carbon black may be surface-treated with a dispersant or another agent or grafted with a resin before use. The carbon black whose surface has been partly graphitized may also be used. Further, before being added to a magnetic coating fluid, the carbon black may be dispersed into a binder. These carbon blacks can be used alone or in combination. The carbon black is preferably used in an amount of 0.1 to 30% by weight based on the amount of the ferromagnetic particles. The carbon black incorporated in the magnetic layer functions to prevent static buildup in the layer, to reduce the coefficient of friction of the layer, as a light screen for the layer, and to improve the strength of the layer. Such effects are produced to different degrees depending on the kind of carbon black used. Therefore it is, of course, possible in the present invention to properly use carbon blacks according to the purpose so as to give an upper magnetic layer, a lower nonmagnetic layer, and a lower magnetic layer which differ in the kind, amount, and combination of carbon blacks, on the basis of the above-described properties including particle size, oil absorption, electrical conductivity, and pH. With respect to carbon blacks usable in the magnetic layer in the present invention, reference may be made to, for example, *Carbon Black Binran* (*Carbon Black Handbook*) edited by Carbon Black Association.

In the present invention, an abrasive material is used in the upper magnetic layer and may also be used in the lower layer. Known abrasive materials mostly having a Mohs' hardness of 6 or more can be used alone or in combination. Examples thereof include α-alumina having an α-alumina structure content of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or more. These abrasive materials preferably have a particle size of 0.01 to 2 μm. If needed, abrasive materials having different particle sizes may be used in combination, or a single abrasive material having a widened particle diameter distribution may be used so as to produce the same effect. The abrasive material preferably has a tap density of 0.3 to 2 g/ml, a water content of 0.1 to 5%, a pH of 2 to 11, and a specific surface area of 1 to 30 $m^2$/g. Although abrasive materials that can be used in the present invention may have any particle shape selected from acicular, particulate, spherical, and cubical forms, a particle shape having a sharp corner as part of the contour is preferred because abrasive materials of this shape have high abrasive properties. Specific examples of the abrasive materials for use in the present invention include AKP-20, AKP-30, AKP-50, HIT-55, and HIT-100 manufactured by Sumitomo Chemical Co., Ltd.; G5, G7, and S-1 manufactured by Nippon Chemical Industrial Co., Ltd.; and TF-100 and TF-140 manufactured by Toda Kogyo Co., Ltd. These abrasive materials may be added to the magnetic fluid after dispersion treatment by a binder. The number of the abrasive materials present in the surface and edge surface of the magnetic layer of the magnetic recording medium of the present invention is preferably 5 per 100 $\mu m^2$ or more.

In the present invention, additives which have lubricating effect, antistatic effect, dispersing effect, or plasticizing effect can be used. Examples of the additives include molybdenum disulfide; tungsten disulfide; graphite; boron nitride; fluorinated graphite; silicone oils; silicones having a polar group; fatty acid-modified silicones; fluorine-containing silicones; fluorine-containing alcohols; alkyl phosphorates and their alkali metal salts; polyphenyl ethers; fluorine-containing alkyl sulfurates and their alkali metal salts; monobasic fatty acids having 10 to 24 carbon atoms (which may contain an unsaturated bond or may be branched) and their metal salts (e.g., Li, Na, K, Cu); mono-, di-, tri-, tetra-, penta-, and hexa-valent alcohols having 12 to 22 carbon atoms (which may contain an unsaturated bond or may be branched); alkoxy alcohols having 12 to 22 carbon atoms; mono-, di- or tri-fatty acid esters, each comprising monobasic fatty acid having 10 to 24 carbon atoms (which may contain an unsaturated bond or may be branched) and any one of mono-, di-, tri-, tetra-, penta- and hexa-valent alcohols having 2 to 12 carbon atoms (which may contain an unsaturated bond or may be branched); fatty acid esters of mono-alkyl ethers of alkylene oxide polymers; fatty acid amides having 8 to 22 carbon atoms; and aliphatic amines having 8 to 22 carbon atoms. Specific examples of the alcohols, acids or esters include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

In addition, there can be used nonionic surface active agents such as alkylene oxides, glycerines, glycidols, or alkylphenol ethylene oxide adducts; cationic surface active agents such as cyclic amines, ester amides, quaternary ammonium salts, hydantoin derivatives, heterocyclic compounds, phosphonium or sulfonium compounds; anionic surface active agents including acidic groups such as carboxylic acid, sulfonic acid, phosphoric acid, sulfuric acid ester groups, or phosphoric acid ester groups; and amphoteric surface active agents such as amino acids, amino sulfonic acids, sulfuric or phosphoric esters of amino alcohols or alkyl betaines. These surface active agents are described in *Surface Active Agent Handbook* by Sangyo Tosho Co., Ltd. These additives such as lubricants, antistatic agents and surface active agents are not necessarily 100% pure, and may further contain impurities such as isomers, unreacted products, by-products, decomposed products, or oxides. The content of the impurities is preferably 30% or less, more preferably 10% or less.

The kinds and amounts of the lubricants and surface active agents for use in the present invention may be changed depending on the objects in the lower nonmagnetic layer and the magnetic layer. For example, spreading of the additives on the surface can be controlled by using fatty acids having different boiling points between the lower nonmagnetic layer and the magnetic layer, spreading thereof can be controlled by using esters having different boiling points and polarities, the stability of coating thereof can be stabilized by regulating the amount of surface active agents, and lubricating effect can be improved by increasing the amount of lubricants in the lower nonmagnetic layer. However, the present invention is not limited thereto.

Part or all of the additives for use in the present invention may be added at any step in a process for producing a magnetic or nonmagnetic coating fluid. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating. There are cases where the purpose is achieved by applying part or all of the additives, according to the purpose, by simultaneous or successive coating after magnetic layer application. Further, it is possible, according to purpose, to apply a lubricant on the magnetic layer surface after calendering or slitting.

Examples of available lubricant products for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acid, NAA-42, NAA-44, Cation SA, Cation MA, Cation AB, Cation BB, Naymeen L-201, Naymeen L-202, Naymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corporation; oleic acid manufactured by Kanto Chemical Co., Ltd.; FAL-205 and FAL-123 manufactured by Takemoto Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF410, KF420, KF965, KF54, KF50, KF56, KF-907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Ahmer Co., Ltd.; Duomin TDO manufactured by Lion Fat and Oil Co., Ltd.; BA-41G manufactured by Nisshin Oil Mills Co., Ltd.,; and Profan 2021E, Newpole PE61, Ionet MS-400, Ionet MO-200, Ionet DL-200, Ionet DS-300, Ionet DS-1000, and Ionet DO-200 manufactured by Sanyo Chemical Co., Ltd.

Examples of organic solvents for use in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities, such as isomers, unreacted raw materials, by-products, decomposition products, oxidation products, and water, besides the main components. The content of these impurities is preferably 30% or less, more preferably 10% or less. It is preferred in the present invention that the organic solvent used for the upper layer be of the same kind as that used for the lower layer. Different solvent amounts may be used for the two layers. It is important that solvents having higher surface tensions (e.g., cyclohexanone, dioxane) should be used for the lower layer to enhance the stability of coating. Specifically, the arithmetic mean thereof for the upper layer solvents should be not lower than that for the lower layer solvents. From the standpoint of improving dispersibility, solvents which are polar to some degree are preferred, and a preferred solvent composition is one at least 50% of which is accounted for by one or more solvents having a dielectric constant of 15 or more. The preferred range of solubility parameter is from 8 to 11.

The nonmagnetic support for use in the present invention may be a known film such as films of polyesters such as poly(ethylene terephthalate) and poly(ethylene naphthalate), polyolefins, cellulose triacetate, polycarbonates, polyamides, polyimides, poly(amideimide)s, and polysulfone. These supports may be subjected beforehand to, e.g., corona discharge treatment, plasma treatment, adhesion-promoting treatment, heat treatment, or dust-removing treatment.

The thickness of the nonmagnetic support in the magnetic recording disk of the present invention is from 1 to 100 µm, preferably from 20 to 85 µm.

An undercoat layer may be provided between the nonmagnetic support and the lower layer in order to improve adhesion. The thickness of the undercoat layer is generally from 0.01 to 2 µm, preferably from 0.05 to 0.5 µm.

The lower nonmagnetic layer and magnetic layer of the magnetic recording medium of the present invention may be provided on one side or both sides of the nonmagnetic support.

In order to attain the objects of the present invention, it is preferred to use a nonmagnetic support having a center line average surface roughness (Ra: cutoff value: 0.25 mm) of 0.03 µm or less, preferably 0.02 µm or less, and more preferably 0.01 µm or less. In addition that the nonmagnetic recording medium of the present invention has a small center line average surface roughness, the nonmagnetic support is preferably free from projections as large as 1 µm or more. The state of the surface roughness of the support can be freely controlled by changing the size and amount of a filler which is incorporated into the support if desired and needed. Examples of the filler include oxides or carbonates of Ca, Si, and Ti and fine organic powders such as acrylic powder. The nonmagnetic support for use in the present invention preferably has an F-5 value in the web running direction of 5 to 50 kg/mm² and an F-5 value in the web width direction of 3 to 30 kg/mm². Although the F-5 value in the web longitudinal direction is generally higher than that in the web width direction, this does not apply in the case where the width direction strength, in particular, should be enhanced.

The degrees of thermal shrinkage of the support in the web running direction and in the web width direction are preferably 3% or less, more preferably 1.5% or less, under conditions at 100° C. for 30 minutes, and are preferably 1% or less, more preferably 0.5% or less, under conditions at 80° C. for 30 minutes. The strength at break thereof is preferably from 5 to 100 kg/mm², and the modulus thereof is preferably from 100 to 2,000 kg/mm².

A process for preparing a magnetic coating fluid for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including magnetic material, nonmagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion. Conventionally known manufacturing techniques can be used as part of the process to attain the object of the present invention. Use of a kneading machine having high kneading power, such as a continuous kneader or pressure kneader, in the kneading step is advantageous in that improved gloss is obtained. Details of this kneading treatment are given in JP-A-1-106338 and JP-A-64-79274. For preparing a coating fluid for the nonmagnetic layer, use of a dispersing medium having a high specific gravity, such as zirconia, is preferred. The following constitutions can be proposed as exemplary coating apparatuses and methods for producing multilayered magnetic recording media such as that of the present invention.

1. A lower layer is first applied with a coating apparatus commonly used for magnetic coating fluid application, e.g., a gravure coating, roll coating, blade coating, or extrusion coating apparatus, and an upper layer is then applied, while the lower layer is in a wet state, by means of a support-pressing extrusion coater such as those disclosed in JP-B-1-46186, JP-A-60-238179, and JP-A-2-265672.

2. An upper layer and a lower layer are applied almost simultaneously using a single coating head having therein two slits for passing coating fluids, such as those disclosed in JP-A-63-88080, JP-A-2-17971, and JP-A-2-265672.

3. An upper layer and a lower layer are applied almost simultaneously with an extrusion coater equipped with a back-up roll, such as that disclosed in JP-A-2-174965.

In order to prevent the electromagnetic characteristics and other properties of the magnetic recording medium from being impaired by aggregation of ferromagnetic particles, shearing is preferably applied to the coating fluid present in the coating head by a method such as those disclosed in JP-A-62-95174 and JP-A-1-236968. The viscosity of each coating fluid should be in the range as specified in JP-A-3-8471.

In the present invention, known orientation devices can be used. For example, the method of orientation include a method of random orientation with a permanent magnet, as disclosed in JP-B-3-41895, or by a method of randomly orienting a magnetic material in an in-plane direction by applying an alternating-current magnetic field, as disclosed in JP-A-63-148417, JP-A-1-300427 and JP-A-1-300428.

Examples of calendering rolls that can be used for producing the magnetic recording medium of the present invention include rolls of a heat-resistant plastic, e.g., epoxy, polyimide, polyamide, or poly(imideamide), and metal rolls. Preferred is calendering with metal rolls. The calendering temperature is preferably from 70° C. or more, and more preferably 80° C. or more. The linear pressure is preferably 200 kg/cm or more, and more preferably 300 kg/cm or more.

The surface inherent resistivity on the magnetic layer side in the magnetic recording medium of the present invention is preferably from $10^5$ to $5\times10^9$ Ω/sq. The modulus at 0.5% elongation of the magnetic layer is preferably from 100 to 2,000 kg/mm² in both the web coating and width directions, and the strength at break thereof is preferably from 1 to 30 kg/cm². The modulus of the magnetic recording medium is preferably from 100 to 1,500 kg/mm² in both web coating and width directions, the residual elongation thereof is preferably 0.5% or less, and the thermal shrinkage thereof at temperature of 100° C. or less is preferably 1% or less, more preferably 0.5% or less, and most preferably 0.1% or less.

The residual solvent content in the magnetic layer is preferably 100 mg/m² or less, more preferably 10 mg/m² or less. It is preferred that the residual solvent content in the magnetic layer be lower than that in the lower nonmagnetic layer.

The void content in each of the magnetic layer and the lower nonmagnetic layer is preferably 30% by volume or less, more preferably 10% by volume or less. The lower nonmagnetic layer preferably has a higher void content than the magnetic layer, but may have a lower void content as long as its void content is 5% or higher.

The present invention will be explained in detail by reference to the following Examples and Comparative Examples, but the invention should not be construed as being limited thereto. All percents, parts, ratios and the like are by weight unless otherwise indicated.

EXAMPLES

Coating Fluid for Nonmagnetic Layer:

| | | |
|---|---|---|
| Inorganic nonmagnetic particles, TiO₂ | | 80 parts |
| Crystal system | rutile | |
| Average primary particle diameter | 0.035 μm | |
| BET specific surface area | 40 m²/g | |
| pH | 7 | |
| TiO₂ content | 90% or higher | |
| DBP absorption | 27–38 g/100 g | |
| Surface-treating agent, Al₂O₃ | 8 wt % | |
| Carbon black | | 20 parts |
| Average primary particle diameter | 16 mμ | |
| DBP absorption | 80 ml/100 g | |
| pH | 8.0 | |
| BET specific surface area | 250 m²/g | |
| Volatile content | 1.5% | |
| Vinyl chloride copolymer | | 12 parts |
| —SO₃Na content | 1 × 10⁻⁴ eq/g | |
| Degree of polymerization | 300 | |
| Polyester polyurethane resin | | 5 parts |
| Neopentyl glycol/caprolactonepolyol/ MDI = 9/2.6/1 | | |
| Containing 1 × 10⁻⁴ eq/g —SO₃Na group | | |
| Butyl stearate | | 8 parts |
| Stearic acid | | 1 part |
| Methyl ethyl ketone | | 100 parts |
| Cyclohexanone | | 80 parts |
| Toluene | | 50 parts |

Coating Fluid for Magnetic Layer:

| | | |
|---|---|---|
| Hexagonal barium ferrite (see Table 1 and 2) | | 100 parts |
| Surface-treating agents, | Al₂O₃ | 5 wt % |
| | SiO₂ | 2 wt % |

-continued

| | |
|---|---|
| Vinyl chloride copolymer | 6 parts |
| —SO₃Na content | 1 × 10⁻⁴ eq/g |
| Degree of polymerization | 300 |
| Polyester polyurethane resin | 3 parts |
| Neopentyl glycol/caprolactonepolyol/ | |
| MDI = 0.9/2.6/1 | |
| Containing 1 × 10⁻⁴ eq/g —SO₃Na group | |
| α-Alumina (particle size, 0.3 μm) | 9 parts |
| Carbon black (particle size, 0.015 μm) | 1 part |
| Butyl stearate | 8 parts |
| Stearic acid | 2 parts |
| Methyl ethyl ketone | 70 parts |
| Cyclohexanone | 50 parts |
| Toluene | 50 parts |

With respect to each of the above coating fluid for nonmagnetic layer formation and coating fluid for magnetic layer formation, the ingredients were kneaded with a continuous kneader and then further kneaded and dispersed with a sand mill. To each of the resulting dispersions was added a polyisocyanate (Coronate L, manufactured by Nippon Polyurethane Co., Ltd.) in an amount of 25 parts by weight for the dispersion for nonmagnetic layer formation and in an amount of 12 parts by weight for the dispersion for magnetic layer formation. To each dispersion was added 20 parts by weight of butyl acetate. The resulting mixtures each was kneaded and stirred, and then filtered through a filter having an average opening diameter of 1 μm. Thus, a coating fluid for nonmagnetic layer formation and a coating fluid for magnetic layer formation were prepared.

Production of Magnetic Recording Media having Magnetic Layer as the only Constituent Layer:

The magnetic coating fluids which differed in the magnetic characteristics of the magnetic particles contained therein were applied to a poly(ethylene naphthalate) support having a thickness of 62 μm and a center-line surface roughness of 0.01 μm (cutoff value, 0.25 mm) at a coating rate of 200 m/min in such amounts as to result in the dry magnetic layer thicknesses shown in Table 2.

While the magnetic layers were still in a wet state, the magnetic particles were oriented by either or both of the following two orientation methods. Thus, the values of orientation ratio and SQn shown in Table 2 were obtained.

(1) Each coated support was passed through two AC magnetic field generators to randomly orient the magnetic particles. In this orientation, the frequency and intensity of the two AC magnetic fields were changed to regulate the randomness of orientation of the magnetic particles.

(2) Unlike-pole-facing permanent magnets were disposed respectively on the upper and lower sides of each coated nonmagnetic support, and the coated support was passed between the magnets to conduct vertical orientation. In this orientation, the magnetic field intensity was regulated by changing the distance between the two magnets to thereby change the degree of vertical orientation of the magnetic particles.

After drying, the coated supports were calendered with a 7-roll calender (linear pressure, 300 kg/cm; temperature, 90° C.), and 3.5-inch disks were punched therefrom. The surfaces of the disks were burnished with an abrasive tape. Using the burnished disks together with necessary mechanical 3.5-inch floppy disk parts, 3.5-inch floppy disk samples 1 to 20 were fabricated.

The magnetic recording disks thus produced each had the above-described magnetic layer on each side of the nonmagnetic support, the two magnetic layers being formed under the same conditions.

Production of Magnetic Recording Media having Thin Magnetic Layer on Nonmagnetic Layer:

Samples were obtained in the same manner as for samples 1 to 20, except that the constituent layers were formed by simultaneous double coating on a poly(ethylene naphthalate) support having a thickness of 62 μm and a center-line surface roughness of 0.01 μm, as follows. The coating fluid for nonmagnetic layer formation was applied first at a dry thickness of 2.0 μm, and any of the coating fluids which differed from one another in the magnetic characteristics of the magnetic particles contained therein was applied immediately thereafter in such an amount as to give a dry magnetic layer thickness shown in Table 2. The samples thus obtained are respectively referred to as samples 21 to 31.

Evaluation of Properties:

Each of the floppy disk samples thus obtained was examined by the following methods to evaluate properties thereof.

Coercive Force (Hc, Hcn) and Orientation Ratio of Magnetic Layer:

Using a sample-vibrating fluxmeter (manufactured by Toei Kogyo Co., Ltd.), measurement was made at a maximum intensity of applied magnetic field of 10 kOe. Orientation ratio was determined by examining each sample for squareness ratio while rotating the magnetic field from 0° to 360° at an interval of 10°, and then calculating the orientation ratio by dividing the minimum squareness ratio by the maximum squareness ratio.

Thickness of Magnetic Layer:

A section of each magnetic layer was prepared, and a photograph thereof was taken with a scanning electron microscope (Type S-700, manufactured by Hitachi Ltd.). The thickness of the magnetic layer was determined from the photograph.

Reproduced Output:

Using FD-1335 (a 13.3 MB drive manufactured by NEC Corp.), the amplitude of 2f signals was evaluated in accordance with JIS X6227. Each measured value of reproduced output is shown as a relative value, with the output value for sample 2 being taken as 100%. Samples having a reproduced output of 90% or higher are suitable for practical use.

Overwriting/Peak shifting:

Using FD-1335 (a 13.3 MB drive manufactured by NEC Corp.), evaluation was made in accordance with JIS X6227. Each measured value is shown as a relative value, with the value for sample 2 being taken as 100%. Samples having an overwriting of 300% or lower and samples having a peak shifting of 120% or lower are suitable for practical use.

Modulation:

Using FD-1335 (a 13.3 MB drive manufactured by NEC Corp.), the modulation of 2f signals was evaluated in accordance with JIS X6227. Samples having a modulation of 10% or less are suitable for practical use.

TABLE 1

| | Properties of Magnetic Materials | | | | |
|---|---|---|---|---|---|
| Kind of magnetic material | Hc (Oe) | σs (emu/g) | Plate diameter (nm) | Aspect ratio | Specific surface area (m²/g) |
| A | 1250 | 60 | 50 | 3 | 35 |
| B | 1380 | 60 | 50 | 3 | 35 |
| C | 1700 | 60 | 50 | 3 | 35 |
| D | 2450 | 60 | 50 | 3 | 35 |
| E | 2970 | 60 | 50 | 3 | 35 |
| F | 3150 | 60 | 50 | 3 | 35 |

TABLE 2

| Sample | Remarks | Kind of magnetic material | Hc (Oe) | Hcn (Oe) | Orientation ratio | SQn | Magnetic layer thickness (μm) | Reproduced output (%) | Overwriting (%) | Modulation (%) | Peak shifting (%) |
|---|---|---|---|---|---|---|---|---|---|---|---|
| 1 | Comparison | A | 1280 | 1280 | 0.95 | 0.50 | 0.4 | 60 | 90 | 3.8 | 120 |
| 2 | Invention | B | 1400 | 1400 | 0.95 | 0.50 | 0.4 | 100 | 100 | 3.8 | 100 |
| 3 | " | C | 1720 | 1720 | 0.95 | 0.50 | 0.4 | 120 | 110 | 3.8 | 70 |
| 4 | " | D | 2480 | 2480 | 0.95 | 0.50 | 0.4 | 110 | 125 | 3.8 | 60 |
| 5 | " | E | 3000 | 3000 | 0.95 | 0.50 | 0.4 | 90 | 125 | 3.8 | 60 |
| 6 | Comparison | F | 3180 | 3180 | 0.95 | 0.50 | 0.4 | 60 | 125 | 3.8 | 60 |
| 7 | " | C | 1720 | 1720 | 0.85 | 0.50 | 0.4 | 120 | 125 | 10.5 | 80 |
| 8 | Invention | C | 1720 | 1720 | 0.90 | 0.50 | 0.4 | 120 | 110 | 5.2 | 80 |
| 9 | Comparison | C | 1720 | 1550 | 0.95 | 0.25 | 0.4 | 65 | 100 | 3.8 | 60 |
| 10 | Invention | C | 1720 | 1620 | 0.95 | 0.30 | 0.4 | 100 | 100 | 3.8 | 60 |
| 11 | " | C | 1720 | 1670 | 0.95 | 0.40 | 0.4 | 115 | 110 | 3.8 | 60 |
| 12 | " | C | 1720 | 1780 | 0.95 | 0.55 | 0.4 | 125 | 125 | 3.8 | 110 |
| 13 | Comparison | C | 1720 | 1820 | 0.95 | 0.60 | 0.4 | 130 | 125 | 3.8 | 145 |
| 14 | " | C | 1720 | 1870 | 0.95 | 0.70 | 0.4 | 135 | 140 | 3.8 | 250 |
| 15 | " | B | 1400 | 1300 | 0.95 | 0.30 | 0.4 | 60 | 90 | 3.8 | 80 |
| 16 | Comparison | B | 1400 | 1350 | 0.95 | 0.40 | 0.4 | 65 | 90 | 3.8 | 90 |
| 17 | Invention | C | 1720 | 1720 | 0.95 | 0.50 | 0.2 | 110 | 40 | 3.8 | 30 |
| 18 | " | C | 1720 | 1720 | 0.95 | 0.50 | 0.6 | 120 | 175 | 3.8 | 90 |
| 19 | " | C | 1720 | 1720 | 0.95 | 0.50 | 0.8 | 120 | 280 | 3.8 | 100 |
| 20 | Comparison | C | 1720 | 1720 | 0.95 | 0.50 | 1.0 | 120 | 500 | 3.8 | 110 |
| 21 | Comparison | C | 1720 | 1550 | 0.95 | 0.25 | 0.4 | 85 | 100 | 1.8 | 60 |
| 22 | Invention | C | 1720 | 1620 | 0.95 | 0.30 | 0.4 | 120 | 100 | 1.8 | 60 |
| 23 | " | C | 1720 | 1670 | 0.95 | 0.40 | 0.4 | 135 | 110 | 1.8 | 60 |
| 24 | " | C | 1720 | 1720 | 0.95 | 0.50 | 0.4 | 140 | 110 | 1.8 | 70 |
| 25 | " | C | 1720 | 1780 | 0.95 | 0.55 | 0.4 | 145 | 125 | 1.8 | 110 |
| 26 | Comparison | C | 1720 | 1820 | 0.95 | 0.60 | 0.4 | 150 | 125 | 1.8 | 145 |
| 27 | " | C | 1720 | 1870 | 0.95 | 0.70 | 0.4 | 155 | 140 | 1.8 | 250 |
| 28 | Invention | C | 1720 | 1720 | 0.95 | 0.50 | 0.2 | 130 | 40 | 1.8 | 30 |
| 29 | " | C | 1720 | 1720 | 0.95 | 0.50 | 0.6 | 140 | 175 | 1.8 | 90 |
| 30 | " | C | 1720 | 1720 | 0.95 | 0.50 | 0.8 | 140 | 280 | 1.8 | 100 |
| 31 | Comparison | C | 1720 | 1720 | 0.95 | 0.50 | 1.0 | 120 | 500 | 1.8 | 110 |

Tables 1 and 2 show that the magnetic recording disks as Examples of the present invention, which disks had a magnetic layer having an Hc of 1,400 to 3,000 Oe, an Hcn of 1,400 to 3,000 Oe, an orientation ratio of 0.9 or more, an SQn of 0.3 to 0.55, and a thickness of 0.8 μm or more, were satisfactory in all of reproduced output, overwriting, modulation, and peak shifting, whereas the magnetic recording disks as Comparative Examples were unsatisfactory in that the value of any of these properties was outside the range suitable for practical use.

The magnetic recording disk of the present invention, which has a magnetic layer comprising a hexagonal ferrite magnetic material, is characterized in that the magnetic layer has an orientation ratio of 0.9 or more, a vertical diamagnetic correction squareness ratio (SQn) of from 0.3 to 0.55, an in-plane coercive force (Hc) of from 1,400 to 3,000 Oe, a vertical-direction coercive force (Hcn) of from 1,400 to 3,000 Oe, and a dry thickness of 0.8 μm or less. Due to these specific properties of the magnetic layer, the magnetic recording disk provided by the present invention can ensure not only the symmetry of recording/reproduction waveform but also reproduced output in a system employing a ring head and have suitability for overwriting and modulation.

While the invention has been described in detail and with reference to specific embodiments thereof, it will be apparent to one skilled in the art that various changes and modifications can be made therein without departing from the spirit and scope thereof.

What is claimed is:

1. A magnetic recording disk which comprises a nonmagnetic support having provided thereon a magnetic layer comprising a hexagonal ferrite magnetic material dispersed in a binder, wherein the magnetic layer has an orientation ratio of 0.9 or more, a vertical diamagnetic correction squareness ratio of from 0.3 to 0.55, an in-plane coercive force of from 1,400 to 3,000 Oe, a vertical-direction coercive force of from 1,400 to 3,000 Oe, and a dry thickness of 0.8 μm or less.

2. The magnetic recording disk as claimed in claim 1, wherein the magnetic recording disk has a nonmagnetic layer between the nonmagnetic support and the magnetic layer, with the nonmagnetic layer mainly comprising inorganic nonmagnetic particles dispersed in a binder.

3. The magnetic recording disk as claimed in claim 1, wherein a lower magnetic layer or a lower nonmagnetic layer is provided between the magnetic layer and the support.

4. The magnetic recording disk as claimed in claim 2, wherein the lower magnetic or nonmagnetic layer and the magnetic layer are coated by a wet-on-wet coating method.

5. The magnetic recording disc as claimed in claim 1, wherein the hexagonal ferrite magnetic material has a plate diameter of from 0.01 to 0.1 μm, a plate thickness from 0.001 to 0.05 μm, and an aspect ratio, plate diameter/plate thickness, of from 1 to 8.

* * * * *